E. GEISEL.
RESILIENT WHEEL.
APPLICATION FILED NOV. 19, 1910.
1,103,502.
Patented July 14, 1914.
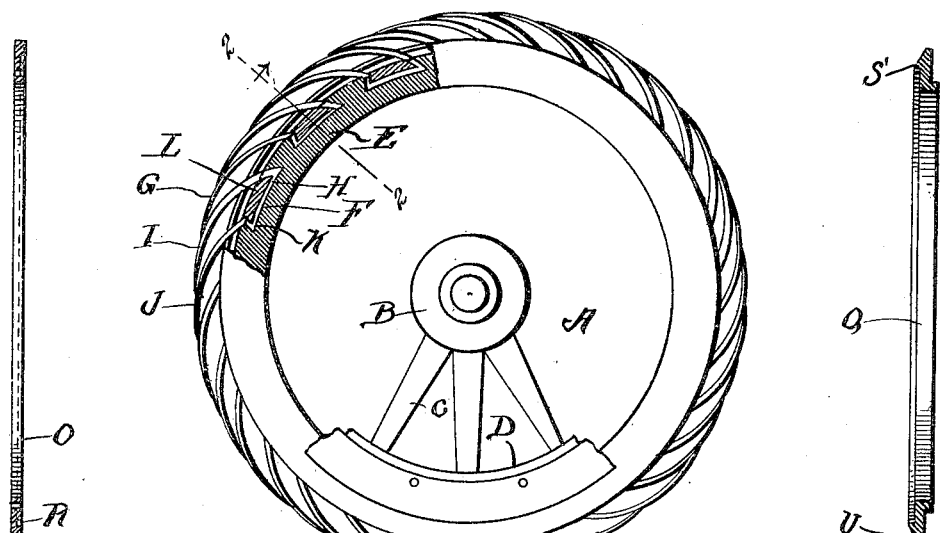
Fig. 3.   Fig. 1   Fig. 4.
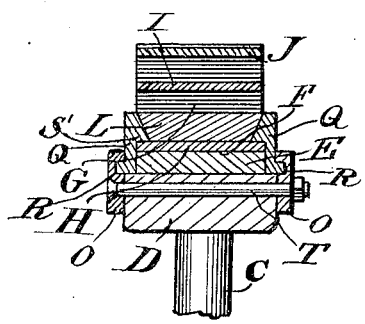
Fig. 2.
Fig. 5.
Witnesses
Francis O. Porock
M. P. Williamson
Inventor
Emanuel Geisel
By W. H. Williamson
Attorney

UNITED STATES PATENT OFFICE.

EMANUEL GEISEL, OF PHILADELPHIA, PENNSYLVANIA.

RESILIENT WHEEL.

1,103,502.  Specification of Letters Patent.  Patented July 14, 1914.

Application filed November 19, 1910. Serial No. 593,199.

*To all whom it may concern:*

Be it known that I, EMANUEL GEISEL, a citizen of the United States, residing at Philadelphia, in the county of Philadelphia and State of Pennsylvania, have invented a certain new and useful Improvement in Resilient Wheels, of which the following is a specification.

My invention relates to new and useful improvements in resilient wheels, and has for its object to produce a wheel of this character intended to perform the functions of the pneumatic tired wheels, and at the same time obviating the disadvantages attendant upon the use of pneumatic tires.

Another object of the invention is to produce a device of this character, forming from the resilient means an anti-skid device, thus combining in each wheel made in this manner an unpuncturable cushioned anti-skid wheel.

The device will be strong and durable, yet simple and of a practical construction and will provide effectual means for maintaining and absorbing shocks incidental to the wheel running over uneven surfaces or obstructions.

The device in its best form will be manufactured similar to a demountable rim, so that the ordinary wheel may be utilized, the device only taking the place of the demountable rim or tire, thus if any portion becomes displaced or broken, my improved portion of the wheel may be removed and replaced by a perfect one, while the imperfect one is being repaired.

With these ends in view this invention consists in the details of construction and combination of elements hereinafter set forth and then specifically designated by the claim.

In order that those skilled in the art to which this invention appertains may understand how to make and use the same, I will describe its construction in detail, referring by numeral to the accompanying drawing forming a part of this specification, in which—

Figure 1, is a segmental sectional view of a resilient wheel embodying my invention. Fig. 2, is a section at the line 2—2 of Fig. 1, looking in the direction of the arrow. Fig. 3 is a vertical sectional view of one of the attaching rings. Fig. 4, is a similar view of one of the holding rings; and Fig. 5, is a perspective view of one of the resilient members.

In carrying out my invention as here embodied A represents an automobile wheel comprising a hub B having a spoke C radiating therefrom, to which is attached the rim D. On this rim is mounted my improvement which comprises an annular supplemental rim E having a plurality of peripheral lateral dove tailed grooves F, in which are placed the resilient members G, each of which is formed from a single piece of material producing a base H and two leaves I and J, said leaves being formed in the arc of a circle and one of each pair adapted to overlap the other one of the same pair when in position, one member of each pair also overlaps one of the members of an adjacent pair.

The portion of the leaf J in proximity to the base is first bent to produce an acute angle with the base as at K, and then from this point bent in the arc of a circle to correspond with the arc of its adjacent member. In mounting the resilient members in position they are placed in the dove tailed grooves so that the base H of each member rests against the bottom wall of each of the grooves, and wedges L are then inserted in each groove between the leaves of each resilient member, which will securely hold said members in position. Each of the leaves J and I of each resilient member G is provided with oppositely disposed notches P formed in each edge of the leaves, and with these notches register the annular inner flanges S' of the holding ring Q, the inner face of said flange engaging the bases H of all of the resilient members. The inner face of this holding ring is beveled as at U in order that it may snugly fit within the notches P. Said holding ring is also provided with an outer flange which is adapted to register with the annular groove R formed in the attaching ring O. Said annular groove produces an annular groove lip S between said groove R and the periphery of the ring, so that said groove lip engages the outer circumference of the outer flange of the holding ring to hold the latter in position and to hold the entire device upon the rim of the wheel. One of these attaching rings is mounted on each side of the wheel and are fastened together by screws or their equivalent T.

From this description it will be seen that a resilient wheel is produced in which the ordinary vehicle wheel may be utilized, so that the rim of said vehicle wheel always remains in the same relation to its hub, the resiliency being produced outside of the vehicle wheel rim as in the case of the pneumatic tire, and since said resilient means is a plurality of spring leaves overlapping the other, the same action is produced as when a pneumatic tire is used with the advantage that no material which may be readily cut come in contact with the road bed, nor is there a material which will burn from the heat produced by the friction between the leaves and the road bed. These leaves being relatively short, can be made very strong and durable with only a sufficient resiliency to give the action of a pneumatic tire. Of course I do not wish to be limited to the exact details of construction as here shown as these may be varied within the limits of the appended claim without departing from the spirit of my invention.

Having thus fully described my invention, what I claim as new and useful is—

In combination with a vehicle wheel, a supplemental rim having in its periphery spaced transverse dovetail grooves, double leaved resilient members comprising complementary bases adapted to fit snugly in said grooves, said leaves being of arcuate form and extending in one direction and tapering toward their extremities, and complemental wedges fitting in said grooves over the bases of said members whereby to lock said members to the supplemental rim.

In testimony whereof, I have hereunto affixed my signature in the presence of two subscribing witnesses.

EMANUEL GEISEL.

Witnesses:
OTTO E. GEISEL,
P. M. MYERS.

Copies of this patent may be obtained for five cents each, by addressing the "Commissioner of Patents, Washington, D. C."